PARITY CIRCUITS EMPLOYING THRESHOLD GATES

Filed Aug. 19, 1964

LEGEND: CROSS HATCHED AREAS DENOTE COMPLEMENTED INPUTS

INVENTOR.
ROBERT O. WINDER
BY Samuel Cohen
Attorney

INVENTOR.
ROBERT O. WINDER
BY Samuel Cohen
Attorney

INVENTOR.
ROBERT O. WINDER
BY
Samuel Cohen
Attorney

INVENTOR.
ROBERT O. WINDER
BY
Samuel Cohen
Attorney

United States Patent Office 3,439,328

Patented Apr. 15, 1969

3,439,328

PARITY CIRCUITS EMPLOYING THRESHOLD GATES

Robert O. Winder, Trenton, N.J., assignor to Radio Corporation of America, a corporation of Delaware Filed Aug. 19, 1964, Ser. No. 390,577
Int. Cl. G06f *11/10*
U.S. Cl. 340—146.1 2 Claims

ABSTRACT OF THE DISCLOSURE

Two levels of threshold gates, the first having $n$ such gates and the second, a single gate. Each gate in the first level produces an output indicative of a threshold function of a different combination of $m$ of $n$ bits and complements of the remaining $n-m$ bits. The gate in the second level receives the signals indicative of bits produced by the gates in the first level and produces an output indicative of the parity function of the $n$ bits.

Parity networks in commercial data processing machines generally employ conventional logic circuits, such as AND and OR gates and inverters. These networks may require relatively large numbers of such gates and inverters. And, depending upon design parameters such as the number of inputs and outputs per gate which are permitted (colloquially termed "fan-in" and "fan-out," respectively), the number of binary digits (bits) which must be handled and so on, such networks may operate relatively slowly. The circuit operating speed depends upon, among other parameters, the speed of the individual logic gates, and the number of levels of logic in the network through which the signals indicative of bits must pass.

Parity networks of "threshold" gates (rather than the more conventional gates above) connected in cascade are described in "The Realization of Symmetric Switching Functions with Linear Input Logical Elements," William H. Kautz, IRE Transactions on Electronic Computers, vol. EC–10, September 1961, pages 371–378. (A threshold gate is one which produces an output indicative of a bit of one value (such as 1) when the sum (the combined amplitude) of the input signals is equal to or greater than some fixed level (threshold) and which produces an output indicative of the bit of other value (0) when the sum of the input signals is less than the threshold. For example, if a gate has a threshold of 3, and a signal or signals indicative of 3 or more 1's are applied to the gate, the gate produces an output indicative of (1). These cascaded networks may be designed to have relatively few threshold gates. However, the fan-ins required may be excessive. As one example, a cascaded threshold gate realization of a 33-bit parity check circuit employing six gates and having six levels of such gates requires fan-ins of from 33 to 65 for different ones of the gates. The practical problem of designing, for example, a 65-input gate to sufficiently close tolerances to be able reliably to distinguish between inputs which in one case may slightly exceed and in another case may be slightly less than the threshold of the gate and at the same time maintaining these inputs at fixed levels within very narrow limits make such gates impractical at the present state of the art.

The circuits of the present invention also employ threshold gates. In the embodiments illustrated, these gates comprise majority or minority gates. A majority gate is one which has an odd number of inputs and which produces an output having a binary value equal to that of the majority of said inputs. A minority gate is one which also has an odd number of inputs and which produces an output having a binary value equal to that of the minority of the inputs.

The number of gates requires for parity networks designed in accordance with the teachings of the present invention is greater than that of corresponding cascade connected arrangements such as discussed above. However, the present networks have the important advantage of requiring relatively few fan-ins to each gate. They also require substantially fewer levels of logic than the cascaded networks. Accordingly, the networks of the present invention not only are easier to build than the cascaded network, but are of relatively higher speed, assuming the same speed for the individual gates.

An $n$ digit parity circuit according to one embodiment of the invention includes in a first level of logic at least $n-1$, $n$-input threshold gates. Each of the gates produces an output $y$ indicative of a threshold function of a different combination of $r$ of the $n$ input bits to each gate and the complements of the remaining $n-r$ of the $n$ input bits. An $n$ input threshold gate in a second level of logic receives as inputs the $y$ outputs of the $n-1$ threshold gates and also one additional input and derives from the total of these $n$ inputs an output indicative of the parity of the $n$ input bits to the circuit.

The invention is discussed in greater detail below and is shown in the following drawings, of which:

FIGURES 1*a* and 1*b* are diagrams which illustrate the conventions employed in the remaining figures;

FIGURES 2*a* and 2*b* illustrate majority and minority gate networks for indicating the parity of a 3-bit input word;

FIGURE 3 shows a network for indicating the parity of a 5-bit word;

FIGURES 4*a*—4*e* are a group of diagrams which mathematically represent a number of algorithms implemented by the gates in FIGURE 3;

FIGURE 5 is a diagram of a parity circuit according to another embodiment of the invention;

FIGURES 6*a*—6*d* are circle diagrams which show in simplified form the grouping of complemented inputs to the circuit of FIGURE 5;

Figures 1A, 1B, 2A, 2B, 3, 4A, 4B, 4C, 4D, 4E:
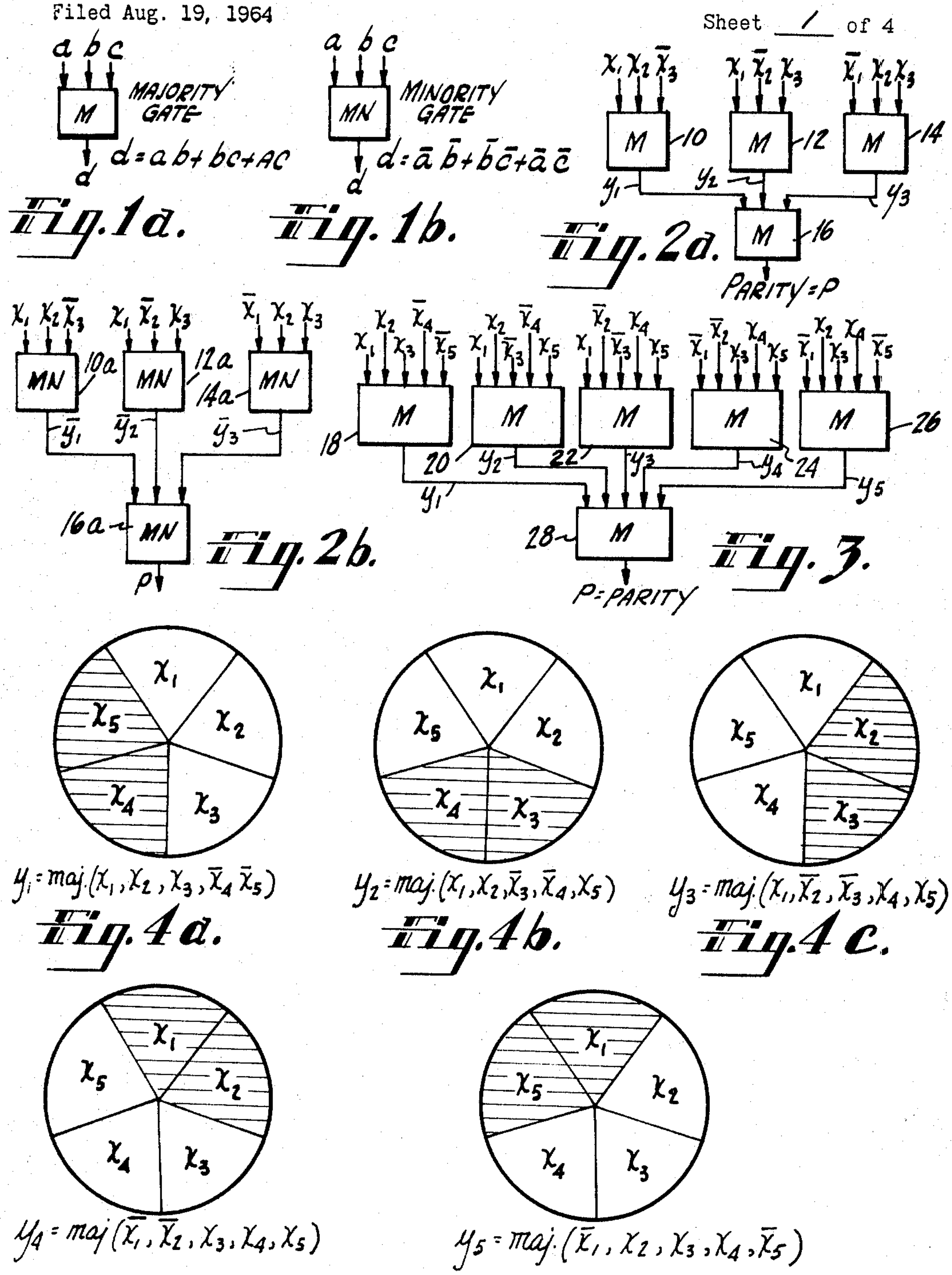

In the circuits discussed below, majority or minority gates are employed. These may include transistors, diodes, resistors, or other elements, all of which are well known. The gates operate in accordance with the Boolean equations shown. They receive electrical signals indicative of bits and produce an output electrical signal indicative of a bit. To simplify the discussion which follows, rather than speaking of the signals which manifest the bits, the bits themselves are referred to.

Before dealing with the circuits themselves, the mathematics involved will be discussed briefly. General proofs of the various equations which follow are available but, as they are quite involved, they have not been included in this application. Instead, a number of specific examples are given to show that the networks designed to implement the equations do, in fact, operate in the manner intended. Let $$n=2m-1 \qquad (1)$$

where $n$ is the number of input bits and $m$ is any integer. It has been discovered that:

$$\text{parity } (x_1, x_2, \ldots, x_n)=\text{maj. } (y_1, y_2, \ldots, y_n) \qquad (2)$$

where $x_1$ is the first of the $n$ input bits, $x_2$ is the second such bit and $x_n$ is the last such bit, and $$y_1=\text{maj. } (x_1, x_2, \ldots, x_m, \bar{x}_{m+1}, \bar{x}_{m+2}, \ldots, \bar{x}_n) \qquad (3)$$

$$y_2=\text{maj. } (x_1, x_2, \ldots, x_{m-1}, \bar{x}_m, \ldots, \bar{x}_{n-1}, x_n) \qquad (4)$$

$$\vdots$$

$$y_{m+1}=\text{maj. } (\bar{x}_1, \bar{x}_2, \ldots, \bar{x}_{m-1}, x_m, \ldots, x_n) \qquad (5)$$

$$y_{m+2}=\text{maj. } (\bar{x}_1, \bar{x}_2, \ldots, \bar{x}_{m-2}, x_{m-1}, \ldots, x_{n-1}, \bar{x}_n) \qquad (6)$$

$$\vdots$$

$$y_n=\text{maj. } (\bar{x}_1, x_2, \ldots, x_{m+1}, \bar{x}_{m+2}, \ldots, \bar{x}_n) \qquad (7)$$

Put in terms of electrical circuits, Equation 3, for example, may be implemented by a single majority gate which receives as inputs $m$ bits $x_1, \ldots, x_m$ and the complements of the remaining $m-1$ bits, that is, $\bar{x}_{m+1}, \ldots, \bar{x}_n$. Put in another, more general way, the majority gate in question which produces $y_1$ receives as inputs any group consisting of $m$ of the $n$ input bits in their uncomplemented form and the remaining $m-1$ bits in their complemented form.

In the simplest non-trivial case illustrated in FIGURE 2*a*, $m=2$ and $n=3$. The majority gates 10, 12 and 14 produce outputs $y_1$, $y_2$ and $y_3$ and apply these outputs to a fourth majority gate 16. Two of the inputs (since $m=2$ in the present case) are applied to each gate in their uncomplemented form, and $m-1$ (or one) of the inputs is applied to each gate in its complemented form. Thus, gate 10 receives $x_1$, $x_2$ and $\bar{x}_3$; gate 12 receives $x_1$, $x_3$ and $\bar{x}_2$; and gate 14 receives $x_2$, $x_3$ and $\bar{x}_1$.

Table I below illustrates the operation of the circuit of FIGURE 2*a*. It is clear from the table that when there is an odd number of 1's in the input bits, two or more of the bits $y_1$, $y_2$, $y_3$ are equal to 1, and gate 16 produces an output $P=1$. When there is an even number of 1's in the input bits, one or none of the bits $y_1$, $y_2$, $y_3$ is a 1, and gate 16 produces an output $P=0$.

Minority gates 10*a*, 12*a*, 14*a* and 16*a*, such as shown in FIGURE 2*b*, may be substituted for the majority gates of FIGURE 2*a* and the same result obtained. This is also illustrated in Table I.

TABLE I

| $x_1$ | $x_2$ | $x_3$ | $y_1$ | Gate outputs, Figure 2a | | | Figure 2b | | | |
|---|---|---|---|---|---|---|---|---|---|---|
| | | | | $y_2$ | $y_3$ | P | $\bar{y}_1$ | $\bar{y}_2$ | $\bar{y}_3$ | P |
| 0 | 0 | 0 | 0 | 0 | 0 | 0 | 1 | 1 | 1 | 0 |
| 0 | 0 | 1 | 0 | 1 | 1 | 1 | 1 | 0 | 0 | 1 |
| 0 | 1 | 0 | 1 | 0 | 1 | 1 | 0 | 1 | 0 | 1 |
| 0 | 1 | 1 | 0 | 0 | 1 | 0 | 1 | 1 | 0 | 0 |
| 1 | 0 | 0 | 1 | 1 | 0 | 1 | 0 | 0 | 1 | 1 |
| 1 | 0 | 1 | 0 | 1 | 0 | 0 | 1 | 0 | 1 | 1 |
| 1 | 1 | 0 | 1 | 0 | 0 | 0 | 0 | 1 | 1 | 0 |
| 1 | 1 | 1 | 1 | 1 | 1 | 1 | 0 | 0 | 0 | 1 |

In the embodiments of the invention shown in FIGURES 2*a* and 2*b*, certain of the inputs to gates are uncomplemented and other of the inputs are complemented. These inputs are shown this way merely for purposes of convenience. One can instead employ gates which include means within the gates for simulating the complementation of one or more of the inputs to the gates. Such gates are shown, for example, in application Ser. No. 378,695, "Threshold Gate," filed June 29, 1964, by Thomas R. Mayhew and assigned to the same assignee as the present application. In the event that such gates are used, then only the uncomplemented inputs need be applied and the ones of the uncomplemented inputs which should be complemented connected to those input terminals which include means for simulating the complementation of these bits. It is to be understood that in FIGURES 2*a* and 2*b*, and in all of the remaining figures, the complementation of a bit can be performed externally of the gates or within the gates, as just explained.

FIGURE 3 illustrates an embodiment of the invention for indicating the parity of a 5-bit word. The circuit includes five gates 18, 20, 22, 24 and 26 in the first level of logic and a single gate 28 in the second level of logic. The operation of the circuit is described in Table II below. This table illustrates only ten different combinations of inputs, whereas thirty-two are possible. However, the properties of duality and symmetry may be employed using only four different combinations of inputs (those appearing on lines 1, 2, 4 and 6 of the table) to prove that the operation is correct for all cases.

TABLE II

| $x_1$ | $x_2$ | $x_3$ | $x_4$ | $x_5$ | $y_1$ | $y_2$ | $y_3$ | $y_4$ | $y_5$ | P |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 1 | 0 | 1 | 1 | 1 | 0 | 1 |
| 0 | 0 | 0 | 1 | 0 | 0 | 0 | 1 | 1 | 1 | 1 |
| 0 | 0 | 0 | 1 | 1 | 0 | 0 | 1 | 1 | 0 | 0 |
| 0 | 0 | 1 | 0 | 0 | 1 | 0 | 0 | 1 | 1 | 1 |
| 0 | 0 | 1 | 0 | 1 | 0 | 0 | 0 | 1 | 0 | 0 |
| 0 | 0 | 1 | 1 | 0 | 0 | 0 | 0 | 1 | 1 | 0 |
| 0 | 0 | 1 | 1 | 1 | 0 | 0 | 1 | 1 | 1 | 1 |
| 0 | 1 | 0 | 0 | 0 | 1 | 1 | 0 | 0 | 1 | 1 |
| 0 | 1 | 0 | 0 | 1 | 0 | 1 | 0 | 0 | 0 | 0 |

The equations for $y_1$ through $y_5$ and some circle diagrams which may be employed to help derive these equations are shown in FIGURES 4*a*–4*e*. Each circle is divided into $n$ equal sectors, where $n=5$ in the present instance. Each of the five sectors represents one of the input bits. The general Equations 1–7 above state that $m$ of the inputs are uncomplemented and $m-1$ of the inputs are complemented. In FIGURE 4*a*, this is shown by cross-hatching two of the sectors, those corresponding to the complemented bits $x_4$ and $x_5$ in the present instance. The second equation $y_2$ is obtainable by rotating the cross-hatched area through $360°/n$ which in the present instance is 72°, as shown in FIGURE 4*b*. The cross-hatched area indicates that the bits $x_3$ and $x_4$ are now complemented and the clear area indicates that the bits $x_1$, $x_2$ and $x_3$ are uncomplemented. The process is continued as indicated in FIGURES 4*c*, 4*d* and 4*e*, to obtain the equations for $y_3$, $y_4$ and $y_5$, respectively.

While for purposes of convenience, contiguous sectors are cross-hatched in FIGURE 4, this is not essential to the invention. For example, one could start by cross-hatching areas $x_1$ and $x_3$ to simulate the following equation:

$$y_1=\text{majority } (\bar{x}_1, x_2, \bar{x}_3, x_4, x_5)$$

The cross-hatched areas rotated through 72° would indicate the second equation, namely:

$$y_2=\text{majority } (x_1, \bar{x}_2, x_3, \bar{x}_4, x_5)$$

The next equation could then be obtained by rotating through another 72°. It would be:

$$y_3=\text{majority } (x_1, x_2, \bar{x}_3, x_4, \bar{x}_5)$$

and so on. This is equivalent in effect to choosing a different ordering of the variables. It should also be understood that the networks of this invention can be modified in other inessential respects. For example, the inputs corresponding to any fixed even number of variables can be complemented wherever they appear in the network. Also, the inputs to the lower threshold gates can be arbitrarily complemented, providing the corresponding threshold gate's output is complemented, or all of its inputs complemented.

In the networks discussed above, when there is a group of $n$ input bits which it is desired to handle as a group, then $n$ gates are required in the first level. It is also possible, however, to arrange the bits in such a way that $n-1$ gates are all that are needed in the first level. The general equations which define the operation of such gates appear below. These equations still depend upon Equation 1 which is $$n=2m-1$$

It has been discovered that:

$$\text{parity } (x_1, x_2, \ldots, x_n)=\text{maj. } \bar{x}_1, Y_1, Y_2, \ldots, Y_{n-1}) \quad (8)$$

where:

$$Y_1=\text{maj. } (x_1, x_2, \ldots, x_m, \bar{x}_{m+1}, \bar{x}_{m+2}, \ldots, \bar{x}_n) \quad (9)$$

$$Y_2=\text{maj. } (x_1, x_2, \ldots, x_{m-1}, \bar{x}_m, \bar{x}_{m+1}, \ldots, \bar{x}_{n-1}, x_n) \quad (10)$$

$$\vdots$$

$$Y_{n-2}=\text{maj. } (x_1, \bar{x}_2, \bar{x}_3, \ldots, x_{m+2}, \bar{x}_{m+3}, \ldots, \bar{x}_n) \quad (11)$$

$$Y_{n-1}=\text{maj. } (x_1, \bar{x}_2, x_3, \ldots, x_{m+1}, \bar{x}_{m+2}, \ldots, \bar{x}_n) \quad (12)$$

In the case of $m=3$, so that $n=5$ $$Y_1=\text{maj. } (x_1, x_2\ x_3, \bar{x}_4, \bar{x}_5) \quad (13)$$

$$Y_2=\text{maj. } (x_1, x_2, \bar{x}_3, \bar{x}_4, \bar{x}_5) \quad (14)$$

$$Y_3=\text{maj. } (x_1, \bar{x}_2, \bar{x}_3, x_4, x_5) \quad (15)$$

$$Y_4=\text{maj. } (x_1, \bar{x}_2, x_3, x_4, \bar{x}_5) \quad (16)$$

Figures 5, 13:
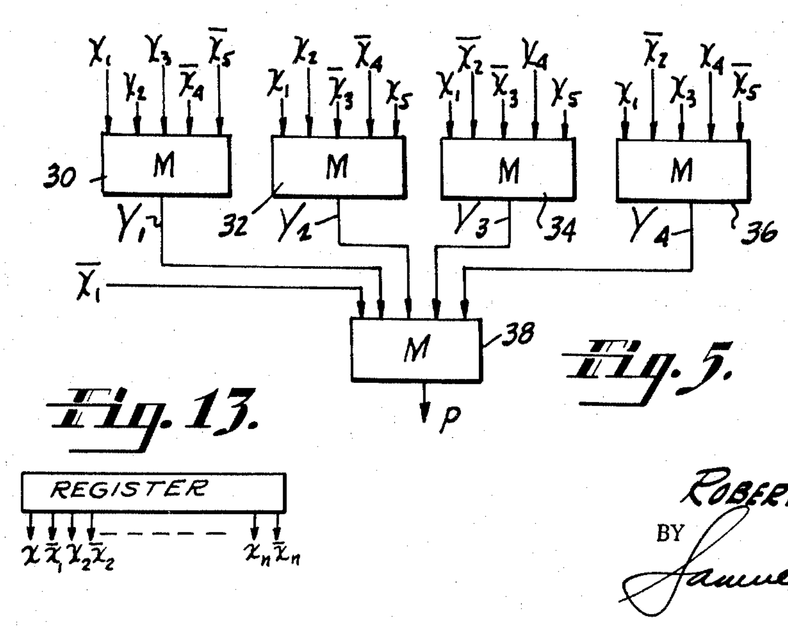
FIGURE 13 is a block diagram of a source providing signals indicative of bits and their complements.

A circuit for handling five bits which implements the equations above appears in FIGURE 5. The circuit includes four majority gates 30, 32 34 and 36 which supply their outputs $Y_1$, $Y_2$, $Y_3$, and $Y_4$, respectively, to a fifth majority gate 38. Any one of the bits ($x_1$ is chosen in the example illustrated) is applied in its uncomplemented form to all of the gates in the first level of logic and in its complemented form to the single gate 38 in the second level of logic. The remaining $2m-2$ bits ($2m-2=4$ in the present instance) are applied to the gates with $m-1$ of the bits uncomplemented and $m-1$ of the bits complemented. In the present instance, $m-1=2$, so that two of each of the four remaining bits are complemented and two are not complemented.

Figure 6A:
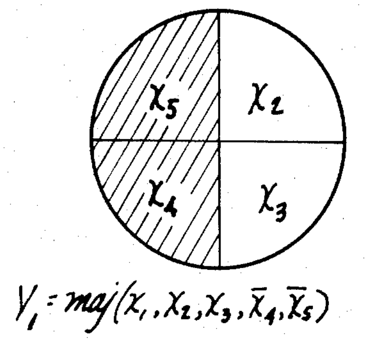

The equations 8–16 above are relatively easy to develop through circle diagrams, since even numbers of bits are complemented. The circle diagrams of FIGURES 6*a*–6*d*, taken by way of example, are applicable to the specific embodiment of FIGURE 5 in which $n=5$ and $m=3$. Since one of the five bits remains uncomplemented when applied to any of the gates on the first level, it is not illustrated in the circle diagrams. The remaining four bits are illustrated by dividing each circle into four sectors. Any two of the sectors chosen initially are cross-hatched. These indicate complemented bits. The circle diagram which results may be employed in deriving the first equation $Y_1$ which, in the example of FIGURE 6*a*, is $$Y_1=\text{majority } (x_1, x_2, x_3, \bar{x}_4, \bar{x}_5)$$

Figure 6B:
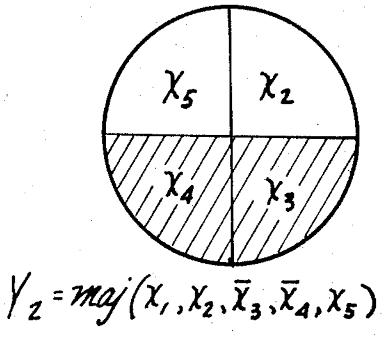

The next equation is derived by rotating the cross-hatched area through $360°/(n-1)$ which, in the present case, is equal to 90°. The rotation through 90° is shown in FIGURE 6*b* from which the equation for $Y_2$ is derived.

$$Y_2=\text{majority } (x_1, x_2, \bar{x}_3, \bar{x}_4, x_5)$$

Figure 6C:
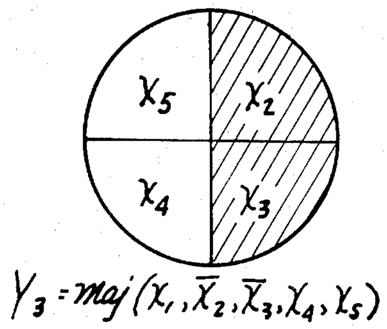
Figure 6D:
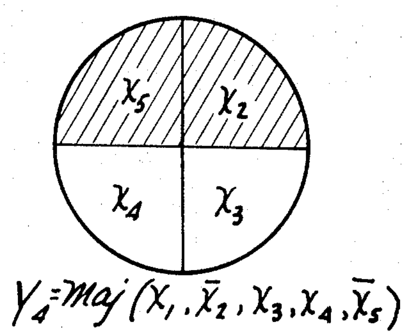

The equations and diagrams of FIGURE 6*c* and FIGURE 6*d* should now be self-evident.

Table III below depicts the operation of the circuit of FIGURE 5 for a number of specific input words of different value.

TABLE III

Figure 12:
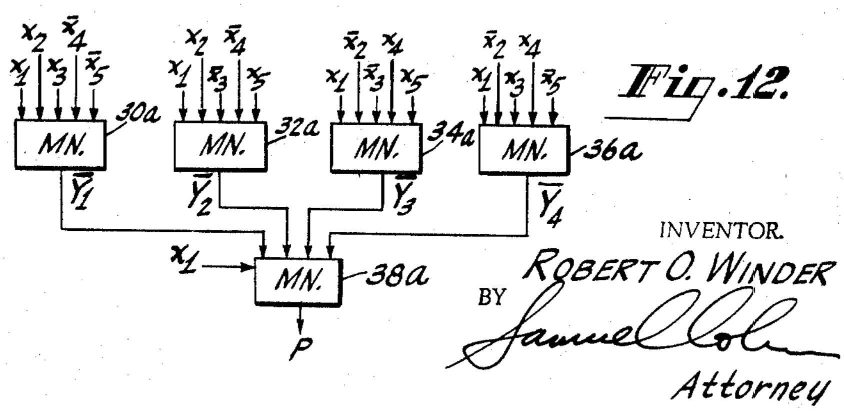
FIGURE 12 is a minority gate embodiment of the circuit shown in FIGURE 5.

| $x_1$ | $x_2$ | $x_3$ | $x_4$ | $x_5$ | Figure 5 | | | | | Figure 12 | | | | |
|---|---|---|---|---|---|---|---|---|---|---|---|---|---|---|
| | | | | | $Y_1$ | $Y_2$ | $Y_3$ | $Y_4$ | P | $\bar{Y}_1$ | $\bar{Y}_2$ | $\bar{Y}_3$ | $\bar{Y}_4$ | P |
| 0 | 0 | 0 | 0 | 0 | 0 | 0 | 0 | 0 | 0 | 1 | 1 | 1 | 1 | 0 |
| 0 | 0 | 0 | 0 | 1 | 0 | 1 | 1 | 0 | 1 | 1 | 0 | 0 | 1 | 1 |
| 1 | 0 | 0 | 1 | 0 | 0 | 0 | 1 | 1 | 0 | 1 | 1 | 0 | 0 | 0 |
| 1 | 0 | 0 | 1 | 1 | 0 | 1 | 1 | 1 | 1 | 1 | 0 | 0 | 0 | 1 |
| 0 | 0 | 1 | 0 | 0 | 1 | 0 | 0 | 1 | 1 | 0 | 1 | 1 | 0 | 1 |
| 1 | 1 | 0 | 1 | 1 | 0 | 1 | 1 | 0 | 0 | 1 | 0 | 0 | 1 | 0 |

FIGURE 12 is a circuit analogous to FIGURE 5 but implemented with minority gates 30*a*, 32*a*, 34*a*, 36*a* and 38*a*. Note that the input $x_1$ to gate 38*a* is uncomplemented whereas the input $x_1$ to gate 38 of FIGURE 5 is complemented. The operation of this circuit is illustrated in Table III above.

Figure 7:
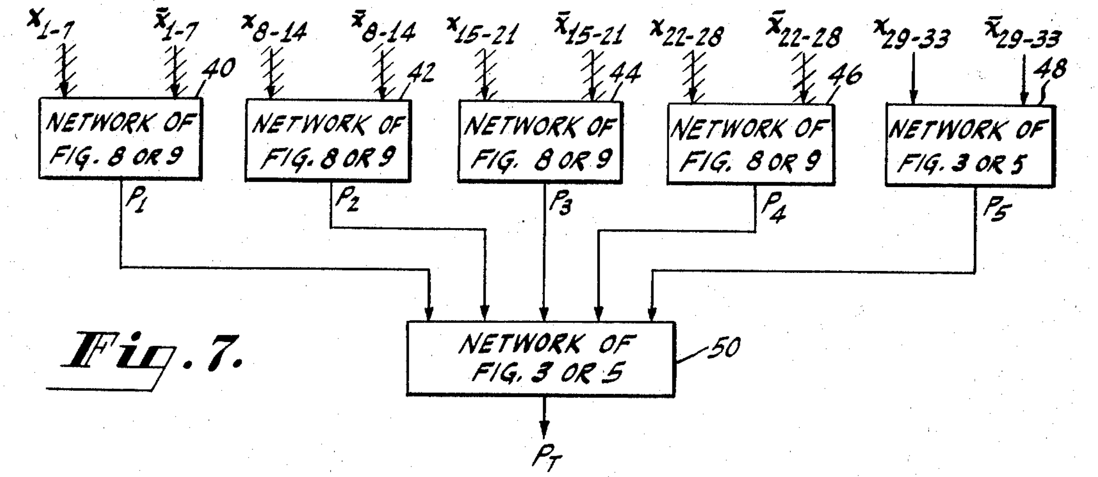
FIGURE 7 is a block circuit diagram of a parity network for handling 33 bits.

The networks discussed so far may be combined with one another to form larger networks for indicating the parity of larger words. FIGURE 7 illustrates one such network, this one for obtaining the parity of a 33-bit word. The network consists of blocks 40, 42, 44, 46 and 48 and block 50 which receives the outputs $P_1$–$P_5$, respectively, of the first blocks.

Figure 8:
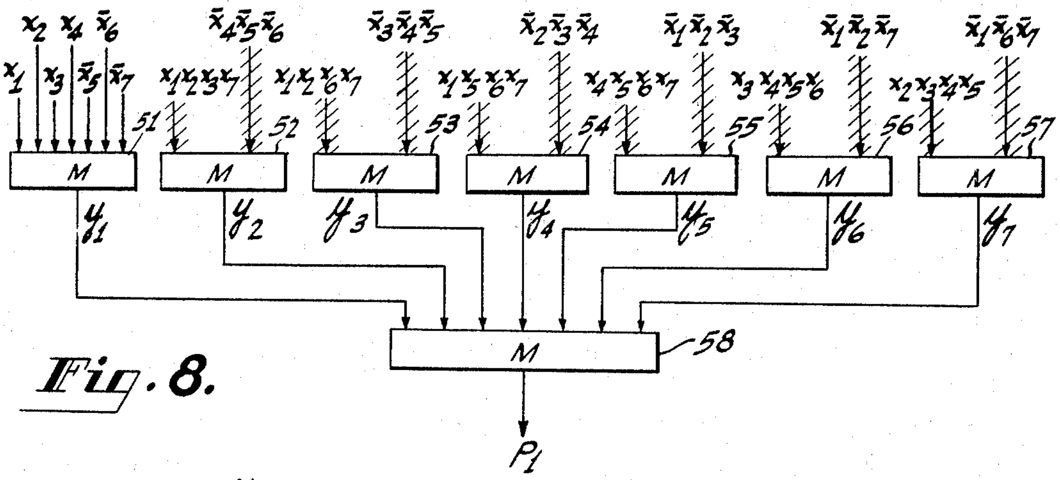
FIGURE 8 shows, in more detail, some of the circuits making up FIGURE 7.

The blocks 40, 42, 44, 46 may each comprise a circuit such as shown in FIGURE 8. This circuit includes seven 7-input majority gates 51, 52, 53, 54, 55, 56 and 57, respectively, in the first level, and one majority gate 58 in the second level. Each of the majority gates in the first level is a 7-input majority gate and each produces an output $y_1$, as defined by the general Equations 2–7 discussed above. The output $P_1$ produced by the network of FIGURE 8 is indicative of the parity of the seven input bits $x_1$–$x_7$ applied to that network. In a similar manner, in FIGURE 7, the output $P_2$ is indicative of the parity of bits $x_8$–$x_{14}$, the output $P_3$ is indicative of the parity of the bits $x_{15}$–$x_{21}$, and the output $P_4$ is indicative of the parity of the bits $x_{22}$–$x_{28}$.

Networks 48 and 50 of FIGURE 7 may consist of the the building blocks of FIGURE 3 which have already been discussed. The output $P_5$ produced by network 48 is indicative of the parity of bits $x_{29}$–$x_{33}$ and the output $P_T$ produced by network 50 is indicative of the parity of the 33-bit word applied to the overall network.

Figure 9:
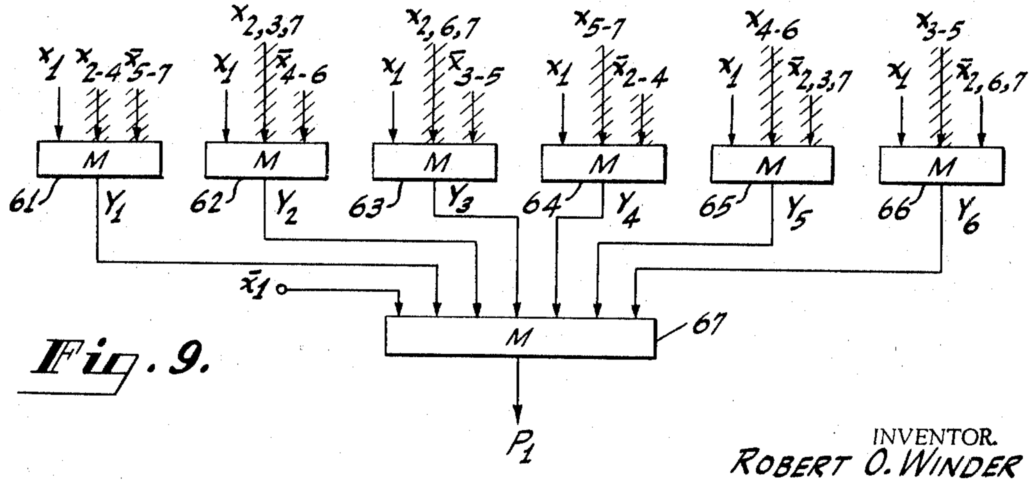
FIGURE 9 shows in greater detail alternative circuits for the network of FIGURE 7.

One may employ the network of FIGURE 9 rather than the one of FIGURE 8 within the blocks 40, 42, 44 and 46 of FIGURE 7. The network of FIGURE 9 includes only six majority gates 61, 62, 63, 64, 65 and 66, respectively, in the first level and a single majority gate 67 in the second level. All the gates are 7-input gates. The network of FIGURE 9 implements the general algorithms of Equations 8–16.

In the manner similar to that above, the networks 48 and 50 may consist of the networks of FIGURE 5 rather than FIGURE 3. The networks of FIGURE 5 have already been discussed.

At this point, it may be in order to compare the complexity and performance of the present network with that of other parity circuits. The circuit of FIGURE 7 implemented with the networks of FIGURES 9 and 5 employs thirty-eight threshold gates, requires four levels of logic and has a maximum fan-in of seven inputs per gate. The same system implemented with the networks of FIGURES 8 and 3 employs a total of forty-four gates and has the same number of levels and fan-ins as the network implemented with the networks of FIGURES 9 and 5.

A conventional parity circuit for obtaining the parity of a 33-bit word which employs 3-input AND gates, OR gates and inverters, requires sixty-four AND gates, fifteen inverters, sixteen OR gates, and eleven levels of logic.

A cascaded network of threshold gates designed according to the general principles discussed in the Kautz article above would require only six gates, but would need six levels of logic. However, the maximum fan-in required would be 65. Another cascaded network could be designed which would require fourteen gates and would also need six levels of logic. Here, the maximum fan-in would be 21 which is still very large by present standards.

Figure 10:
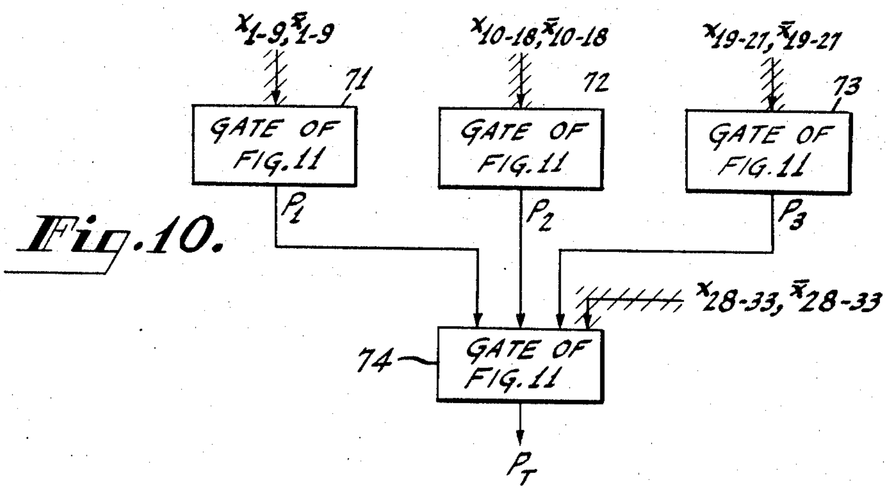
FIGURE 10 is a diagram of a network according to another embodiment of the invention for determining the parity of a 33-bit word.

It is possible to combine various of the building blocks discussed generally herein in many different ways to synthesize parity networks. FIGURE 10 is for the purpose of illustrating one additional permutation. It includes a total of four blocks 71, 72, 73 and 74. Blocks 71, 72 and 73 generate bits $P_1$, $P_2$ and $P_3$, each indicative of the parity of the nine bits supplied to the respective blocks. Gate 74 produces an output $P_T$ indicative of the parity of $P_1$, $P_2$, $P_3$, $x_{28}$, . . . , $x_{33}$. $P_T$ is therefore indicative of the parity of the complete 33-bit input word $x_1$, . . . , $x_{33}$.

Figure 11:
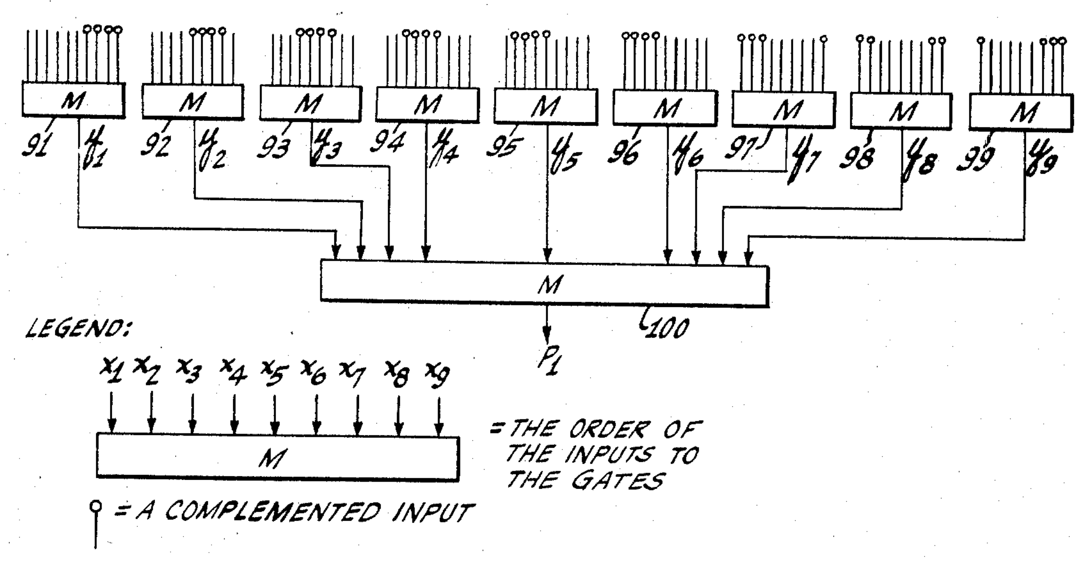
FIGURE 11 is a more detailed diagram of circuits within the blocks of FIGURE 10.

Blocks 71, 72 and 73 of FIGURE 10 may each be implemented by nine 9-input majority gates 91–99 in a first level and a single majority gate 100 in the second level, as illustrated in FIGURE 11. The output $P_1$ obtained is indicative of the parity of the nine input bits to the network. Accordingly, the bits $P_1$, $P_2$ and $P_3$ of FIGURE 10 are each indicative of the parity of the nine input bits received by the network producing the P. The network 74 corresponds to the one of FIGURE 11, the fourth to the ninth input bits being $x$ bits and the first to the third bits being P bits.

The network of FIGURE 10 employs a total of forty gates, has a total of four levels of logic, and each gate has a maximum fan-in of nine inputs. The same network may be implemented in accordance with Equations 8–16 in which case only thirty-six gates are required.

While in most of the networks illustrated, majority gates are employed, it should be appreciated that minority gates may be substituted and the same results obtained. This should be clear from FIGURES 2*b* and 12. However, it should be appreciated that when the invention is embodied in accordance with the Equations 8–16, the bit supplied to the gate in the second level should be uncomplemented in the case of minority gates, as shown at the $x_1$ input to gate 38*a* of FIGURE 12, and complemented in the case of majority gates, as shown at the $\bar{x}_1$ input to the gate 38 of FIGURE 5.

The claims which follow refer to parity circuits. Such circuits are sometimes known instead as "sum-modulo-2" circuits, "communications code" circuits, or the like. The claims, of course, apply to these circuits as well. Also, the circuits claimed check for odd or even parity as desired, the output $P=0$, for example, being indicative of even parity.

What is claimed is:

1. A parity circuit for an $n$ bit word $x_1$, . . ., $x_n$, where $n=2m-1$, $n$ and $m$ both being integers other than zero, comprising:

first means providing manifestations of an $n$ bit word;

$n$ logic gate means, each responsive to said first means and receptive of manifestations of all of said $n$ bits for producing a respective output indicative of the majority function of respectively different combinations of $m$ of the $n$ bits and complements of the remaining $m-1$ of the $n$ bits; and a majority gate receptive of the respective outputs of said $n$ logic gate means for producing an output indicative of the majority function of said $n$ outputs.

2. A parity circuit for an $n$ bit word $x_1$, . . ., $x_n$, where $n=2m-1$, $n$ and $m$ both being integers other than zero, comprising:

first means providing manifestations of an $n$ bit word;

$n$ logic gate means, each responsive to said first means and receptive of manifestations of all of said $n$ bits for producing a respective output indicative of the minority function of respectively different combinations of $m$ of the $n$ bits and complements of the remaining $m-1$ of the $n$ bits; and a minority gate receptive of the respective outputs of said $n$ logic gate means for producing an output indicative of the minority function of said $n$ outputs.

References Cited

UNITED STATES PATENTS 2,999,637 9/1961 Curry ............ 235—175

FOREIGN PATENTS 958,884 5/1964 Great Britain.

OTHER REFERENCES

Chu, Yaohan: Digital Computer Design Fundamentals, McGraw-Hill, 1962. pp. 130–131.

Lindaman, Richard: A New Concept in Computing, IRE Proceedings, vol. 48, p. 257, February 1960.

Wigington, R. L.: A New Concept in Computing, IRE Proceedings, vol. 47, pp. 516–523, April 1959.

Miller, H. S.: Majority Gates Applied to Simultaneous Comparators, IRE Transactions on Electronic Computers, March 1961, pp. 94–95.

Moreines, H., et al.: Majority Noting Protects Aircraft and Pilot, Electronics, May 18, 1964. Copy in Group 236.

MALCOLM A. MORRISON, *Primary Examiner.*

CHARLES E. ATKINSON, *Assistant Examiner.*

U.S. Cl. X.R.

235—153